United States Patent
Sun et al.

(10) Patent No.: US 9,419,941 B2
(45) Date of Patent: Aug. 16, 2016

(54) DISTRIBUTED COMPUTER NETWORK ZONE BASED SECURITY ARCHITECTURE

(71) Applicants: Yi Sun, San Jose, CA (US); Meng Xu, Los Altos, CA (US); Lee Cheung, Foster City, CA (US); Hsisheng Wang, Santa Clara, CA (US); Chuong-Yaw Michael Shieh, Palo Alto, CA (US)

(72) Inventors: Yi Sun, San Jose, CA (US); Meng Xu, Los Altos, CA (US); Lee Cheung, Foster City, CA (US); Hsisheng Wang, Santa Clara, CA (US); Chuong-Yaw Michael Shieh, Palo Alto, CA (US)

(73) Assignee: VARMOUR NETWORKS, INC., Santa Clara, CA (US)

( * ) Notice: Subject to any disclaimer, the term of this patent is extended or adjusted under 35 U.S.C. 154(b) by 0 days.

(21) Appl. No.: 13/849,315

(22) Filed: Mar. 22, 2013

(65) Prior Publication Data

US 2013/0254871 A1 Sep. 26, 2013

Related U.S. Application Data

(60) Provisional application No. 61/685,697, filed on Mar. 22, 2012.

(51) Int. Cl.
*H04L 29/06* (2006.01)
(52) U.S. Cl.
CPC .......... *H04L 63/0209* (2013.01); *H04L 63/104* (2013.01)

(58) Field of Classification Search
CPC ........ G06F 21/00; G08B 13/00; B42D 15/00; H04L 63/00; H04L 63/0209; H04L 63/104; H04L 29/06
USPC ...................................................... 726/11, 12
See application file for complete search history.

(56) References Cited

U.S. PATENT DOCUMENTS

| | | | |
|---|---|---|---|
| 2005/0081058 A1* | 4/2005 | Chang | H04L 63/105 726/4 |
| 2006/0177063 A1* | 8/2006 | Conway et al. | 380/270 |
| 2010/0100616 A1* | 4/2010 | Bryson et al. | 370/392 |
| 2010/0281533 A1* | 11/2010 | Mao et al. | 726/13 |
| 2011/0030037 A1* | 2/2011 | Olshansky | H04L 12/4641 726/4 |
| 2011/0261722 A1* | 10/2011 | Awano | 370/254 |
| 2011/0299533 A1* | 12/2011 | Yu et al. | 370/392 |
| 2012/0254980 A1* | 10/2012 | Takahashi | 726/13 |
| 2012/0287931 A1* | 11/2012 | Kidambi et al. | 370/392 |
| 2013/0019277 A1* | 1/2013 | Chang et al. | 726/1 |

* cited by examiner

*Primary Examiner* — Chau Le
*Assistant Examiner* — Muhammad Chaudhry
(74) *Attorney, Agent, or Firm* — Blakely, Sokoloff, Taylor & Zafman LLP

(57) ABSTRACT

A method and apparatus is disclosed herein for distributed zone-based security. In one embodiment, the method comprises: determining an ingress security zone associated with an ingress of a first network device based on a first key and a media access control (MAC) address of a source of a packet; determining an egress security zone of a second network device based on a MAC address of a destination for the packet and a second key; performing a policy lookup based on the ingress security zone and the egress security zone to identify a policy to apply to the packet; and applying the policy to the packet.

5 Claims, 4 Drawing Sheets

Traditional L2 Security Zone

Distributed L2 Security Zone

DISTRIBUTED COMPUTER NETWORK ZONE BASED SECURITY ARCHITECTURE

PRIORITY

The present patent application claims priority to and incorporates by reference the corresponding provisional patent application Ser. No. 61/685,697, titled "Distributed Computer Network Layer Zone Based Security Architecture," filed on Mar. 22, 2012.

FIELD OF THE INVENTION

Embodiments of the present invention are in the field of network security; more particularly, embodiments of the present invention are related to a security system (e.g., Layer2 security system) that is spread across multiple physical devices.

BACKGROUND OF THE INVENTION

Currently, all Layer2 security devices (e.g., security gateways) utilize a concept of a "security zone" that operate within a single device. FIG. 1 illustrates a traditional security zone with its associated security gateway (e.g., a firewall). The security gateway implements the security zone by performing zone securing screening and protection on the network traffic. As part of the zone securing screening, the security gateway determines whether the network traffic that is coming in on one of its ingress physical ports is from a trusted or untrusted source and whether it's going out one of its egress physical ports to a trusted or untrusted destination. Based on these determinations, the security gateway applies a policy to determine whether the network traffic should be allowed to proceed to its destination.

The current security zone architecture is deficient for a number of reasons when used in a distributed network environment in which distributed networking traffic is passed between different network devices. For example, the current L2 security zone concept has no idea that the hosts may not be local, and hence it may need another software layer to determine the packet egress path to those hosts. Furthermore, by looking at the security session information, the user/administer has no way to know the where the host is located. Lastly, the user/administer does not have a way to define a security policy across devices for finer security control. For example, the administer can't define a inter-device L2 security zone policy.

SUMMARY OF THE INVENTION

A method and apparatus is disclosed herein for distributed zone-based security. In one embodiment, the method comprises: determining an ingress security zone associated with an ingress of a first network device based on a first key and a media access control (MAC) address of a source of a packet; determining an egress security zone of a second network device based on a MAC address of a destination for the packet and a second key; performing a policy lookup based on the ingress security zone and the egress security zone to identify a policy to apply to the packet; and applying the policy to the packet.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
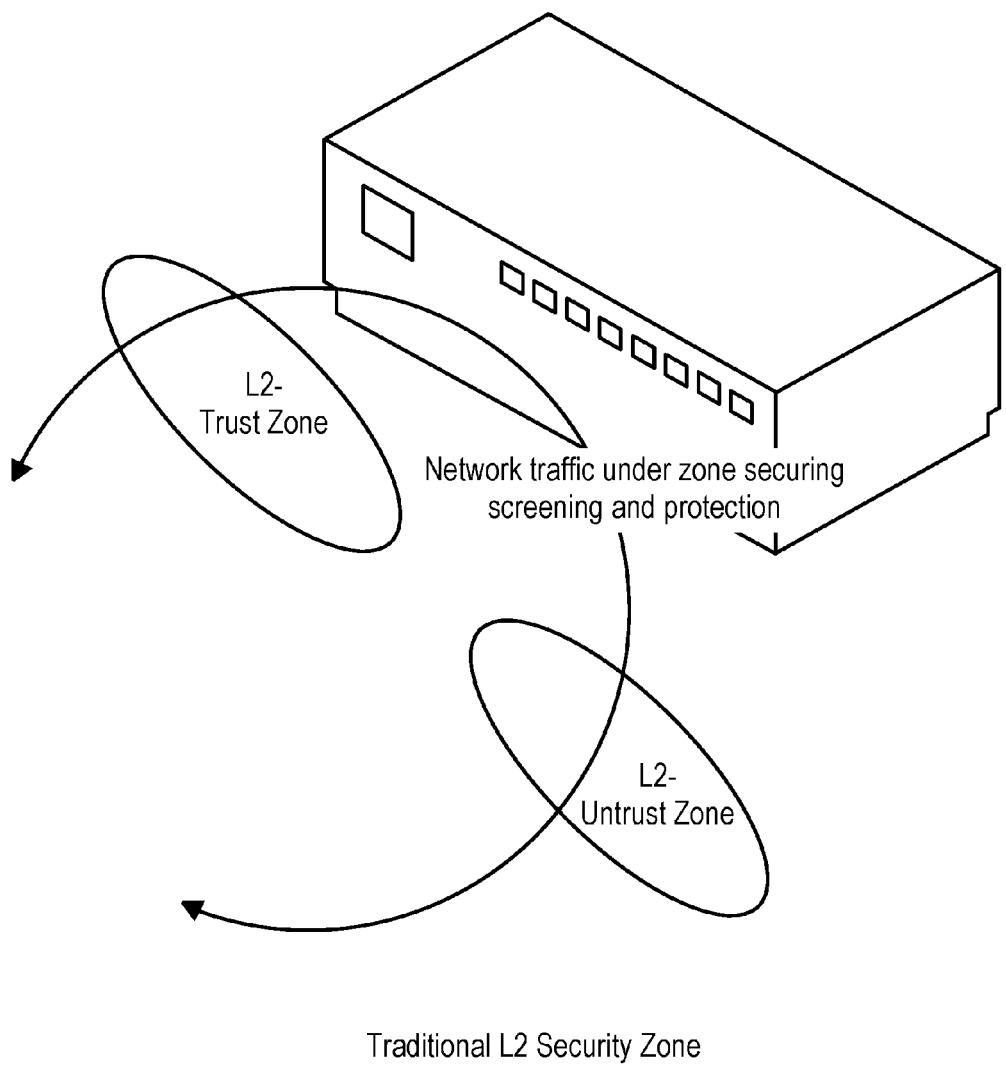
FIG. 1 illustrates a prior art L2 security zone.

Embodiments of the present invention utilize distributed security gateways to form a unified Layer2 security zone. Unlike any traditional security gateway, embodiments of the present invention allow multiple network interfaces from different network devices to form a security zone. Thus, any uniform policy/rules can be applied to the network traffic from those ingress/egress ports, regardless of traffic origination. Thus, embodiments of the present invention extend a "security zone" to span across multiple devices.

The distributed architecture and the cooperation between multiple security gateways provide great scalability that combining the computation resources and memory storage to form a scalable protection mechanism.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

Figure 2:
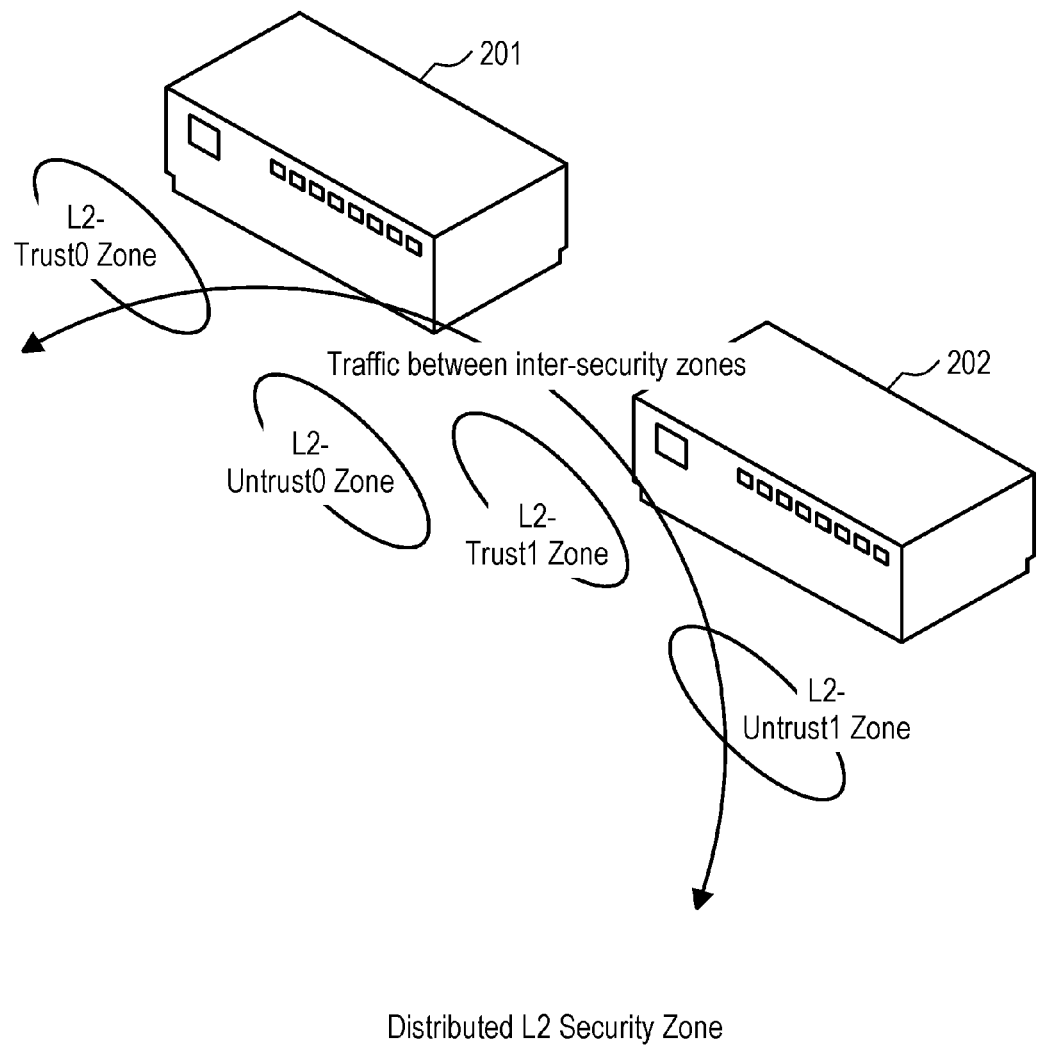
FIG. 2 illustrates one embodiment of a distributed L2 security zone.

FIG. 2 illustrates a distributed L2 security zone. Referring to FIG. 2, two security gateways 201 and 202 are shown and form a distributed security zone. Each distributed security zone is assigned a unique key or identifier (ID). In a case where there are 2 security devices, such as security gateways 201 and 202, each network device has a unique key. Each of one or more ports are assigned or bound to specific security zone. In one embodiment, a console (not shown) handles the assignments for one or more network devices. In another embodiment, the network devices (e.g., security gateways) handle the assignments themselves.

As an example, I/O device 0 has a unique key 'G', and I/O device 1 with unique key 'Y'. In one embodiment, the key is the device's ID. In one embodiment, the key is a unique value based on the device's UUID. Using the unique keys G and Y, the following security zones are created:

I/O device 0:
  L2-trustG, L2-untrustG, L2-DMZG
I/O device 1:
  L2-trustY, L2-untrustY, L2-DMZY Thus, in the case of I/O device 0, a first port is assigned to a trusted security zone, while a second port is assigned to an untrusted security zone. The same is true for I/O device 1. In the example, L2-trustG and L2-trustY have the same security level by default. L2-DMZG is the Layer-2 DMZ zone with key G (i.e., it belongs to device 0), while L2-DMZY is the Layer-2 DMZ zone with key Y (i.e., it belongs to device 1). In one embodiment, an administrator can assign the first port to a Layer-2 Trusted security zone (e.g., l2-trust), while assigning the second port to a Layer-2 Untrusted security zone (e.g., I2-untrust).

In one embodiment, when network traffic arrives at a network device (e.g., a security gateway), the network device uses the packet's destination MAC address and an input from the software defined network (SDN) protocol, such as OpenFlow or OpenStack, to determine the destination in a manner well-known in the art. In one embodiment, an OpenFlow controller makes a decision as to where the packet's destination is.

The network device also uses the source and destinations of each of the packets to ascertain a policy to apply to determine whether the passage of the traffic should be allowed. In one embodiment, the network device obtains the security zone associated with the source of the packets and the security zone associated with the destination of the packets and based on those two security zones is able to determine what policy to apply to the traffic. Once the policy has been identified, the network device applies the policy.

Using the example above, in one embodiment, when the network device receive a packet at a specific ingress port, the network device uses the unique key and source packet MAC address to compute an ingress security zone (e.g., L2-turstG). In one embodiment, to compute the security zone, an administer binds the interface to the zone first. For example:

varmour@vArmour(config)(M)>set zone 12-trust interface ge-1/0/5.0
varmour@vArmour(config)(M)>commit The interface "ge-1/0/5.0" is associated with the 12-trust security zone. Thus, all ingress packets from the ge-1/0/5.0 interface will hence have an 12-trust zone security attribute.

The network device also performs an egress zone determination in which the network device uses the packet's destination MAC address to determine the key that identifies the network device (e.g., the security gateway) that has the egress port and the L2 security zone associated with that port (e.g., L2-untrustY).

Once the ingress and egress security zones are determined, the network device performs a look up operation on a memory that stores a security policy/rule. Using the example, if the rule allowed L2-trustG→L2-unturstY, which means that traffic from trust zone G can be forwarded to trust zone Y, then the network device would permit the traffic going in that direct. If L2-untrustG and L2-untrustY are in the same security level, it is equivalent to look up policy "L2-trustG→L2-untrustG", such that any traffic from either can be forwarded through to the destination security zone. In one embodiment, the network device accomplishes this through an optimization, such as, for example, all the L2-trust zone have the same security level (i.e. L2-trust (Device0)==L2-trust (Device1)) regardless the "key" value (locality). This can be changed so that each security zone inside devices have an independent security level. In one embodiment, there is a policy table stored in a memory on the device to store all the rules (e.g., allow/deny) between security zones.

Once a policy has been obtained, the network device applies the policy. Assuming the policy allows the traffic to flow in the specified direction between the two security zones, the network device sends the traffic to the destination network device that is associated with the egress security zone and the ID of that destination network device. Note that prior to sending the traffic, the network device may perform security checking on packets in the traffic (e.g., NAT, firewall, etc.). The destination network device can perform further L2 processing (e.g., MAC lookup on a packet's destination MAC to find its egress interface, etc.) to determine a final physical egress port to which to output the packets of the network traffic.

In one embodiment, one or more security zones span more than two network devices. In such a case, all the devices form a security zone that behaves as a "single device" virtually, so that the ingress device can determine the egress security zone and apply a policy accordingly.

Figure 3:
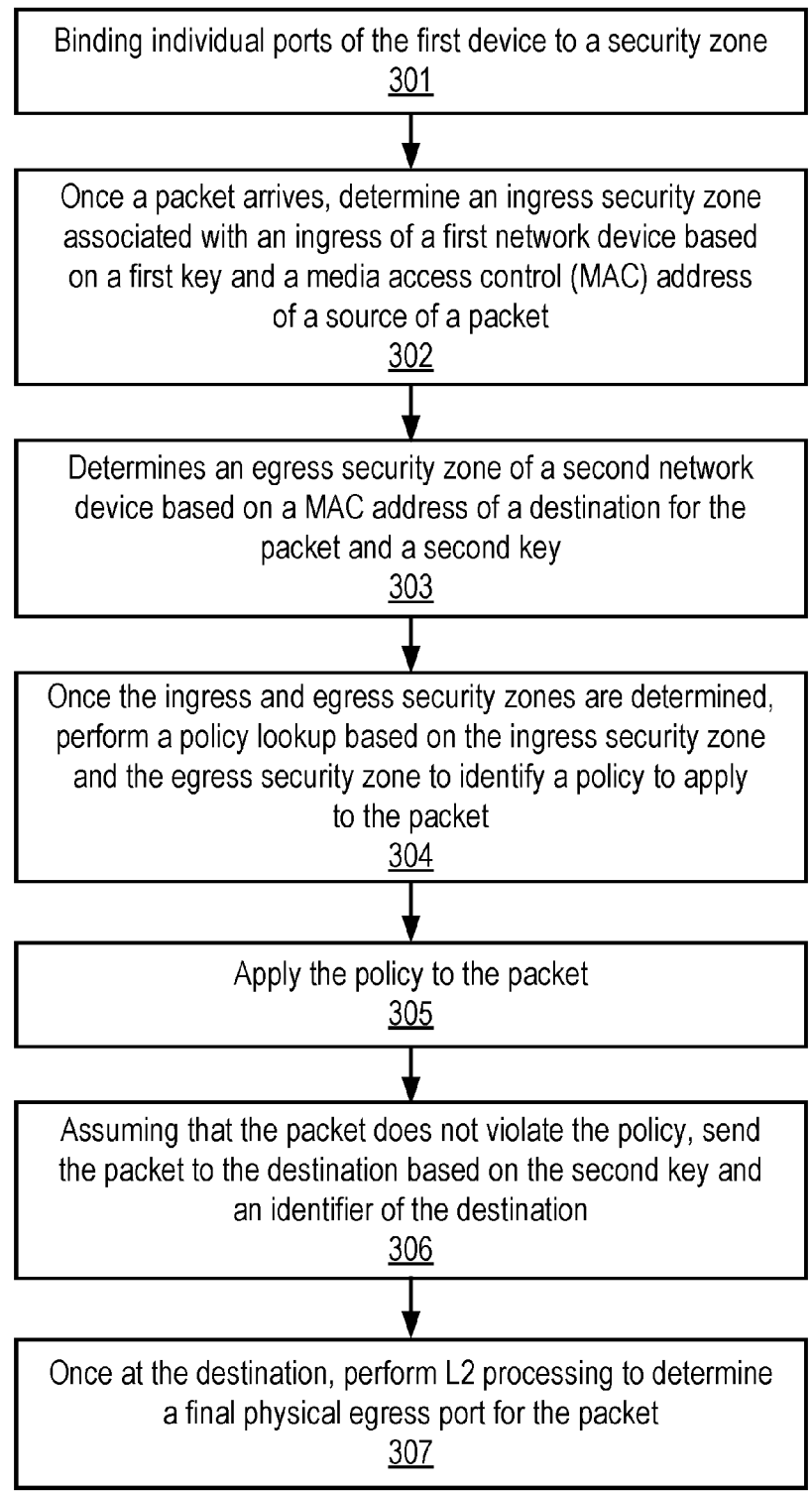
FIG. 3 is a flow diagram of one embodiment of a process for transferring packets through a distributed security zone.

FIG. 3 is a flow diagram of one embodiment of a process for processing a packet. The process is performed by processing logic that may comprise hardware (circuitry, dedicated logic, etc.), software (such as is run on a general purpose computer system or a dedicated machine), or a combination of both. The process may be performed by one or more security gateways or other network devices in a distributed network environment.

Referring to FIG. 3, the process begins by binding individual ports of the first device to a security zone (processing block 301).

Once a packet arrives, processing logic determining an ingress security zone associated with an ingress of a first network device based on a first key and a media access control (MAC) address of a source of a packet (processing block 302).

Next, processing logic determines an egress security zone of a second network device based on a MAC address of a destination for the packet and a second key (processing block 303). Besides the destination MAC lookup, processing logic queries the SDN protocol, such as, for example, OpenFlow or OpenStack, to determine the destination.

Once the ingress and egress security zones are determined, processing logic performs a policy lookup based on the ingress security zone and the egress security zone to identify a policy to apply to the packet (processing block 304) and applies the policy to the packet (processing block 305). In one embodiment, applying the policy occurs when the packet ingresses and egresses different security zones.

Assuming that the packet does not violate the policy, processing logic sends the packet to the destination based on the second key and an identifier of the destination (processing block 306). Once at the destination, processing logic performs L2 processing to determine a final physical egress port for the packet (processing block 307). In one embodiment, the L2 processing comprises a MAC lookup operation.

One Embodiment of a Security Gateway

In one embodiment, the security gateway comprises a memory, a network interface, a second interface and a processor. The network interface receives IP packets and stores them, at least temporarily in a memory. The processor determines an ingress security zone associated with an ingress of a first network device based on a first key and a media access control (MAC) address of a source of a packet, determines an egress security zone of a second network device based on a MAC address of a destination for the packet and a second key, performs a policy lookup based on the ingress security zone and the egress security zone to identify a policy to apply to the packet, and applies the policy to the packet.

Figure 4:
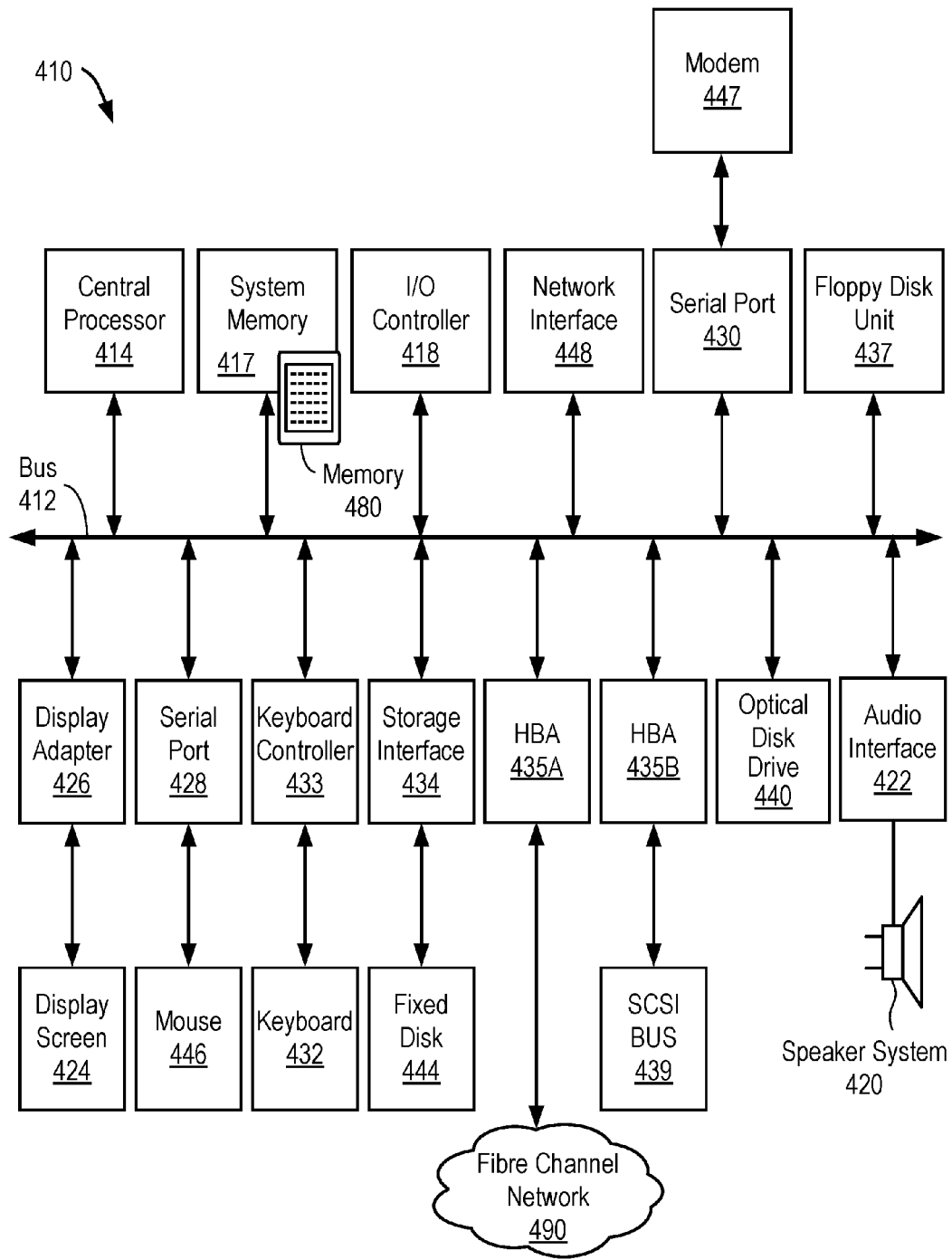
FIG. 4 depicts a block diagram of one embodiment of a security gateway.

FIG. 4 depicts a block diagram of a security gateway, such as security gateway 150 of FIG. 1. Referring to FIG. 4, security gateway 410 includes a bus 412 to interconnect subsystems of security gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP) (e.g., servers 101, 111-114 of FIG. 1). Network interface 448 may provide a direct connection to a remote network device, such as, for example, a connection between network devices 201 and 202 of FIG. 2, and to other network devices, such as remote servers and hosts. Network interface 448 may provide a direct connection to a remote server or network device via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the security gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

As described above, the network devices in FIG. 2 may be implemented using a computer system. In one embodiment, one or more of the network devices is implemented using a system such as depicted in FIG. 4 as well. The code is stored in computer-readable storage medium such as system memory 417, fixed disk 444, optical disk 442 or floppy disk 448. This code includes code to implement the security zone operations as described above and code to transfer packets in the distributed network system.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:

binding individual ports of a first network device to a security zone;

determining an ingress security zone associated with a packet received at an ingress port of the first network device based on a first key that identifies the first network device and a media access control (MAC) address of a source of a packet, wherein the ingress port of the first network device is bound to a first security zone prior to receipt of the packet at the ingress port, wherein the first security zone for the ingress port is defined by a first security level and the first key;

determining, from a MAC address for a destination of the packet, a second key that identifies a second network device that has an egress port for communicating the packet to the destination, wherein a software defined network (SDN) protocol is queried to determine the destination for the packet;

determining an egress security zone associated with the egress port of the second network device based on the egress port and the second key, wherein the egress port of the second network device is bound to a second security zone prior to transmission of the packet at the egress port, wherein the second security zone for the egress port is defined by a second security level and the second key;

performing a policy lookup based on the first security level and the first key of the ingress security zone and the second security level and the second key of the egress security zone in a policy table, wherein the policy lookup identifies a policy to apply to the packet when first security level and the second security level are different security levels, and wherein the policy lookup identifies a second policy allowing the forwarding of the packet when first security level of the first security zone and the second security level of the second security zone are at a same security level regardless of values of the first key and the second key;

applying the policy to the packet based on the first security level and the second security level when the ingress security zone and the egress security zone are different security zones; and sending the packet to the destination based on the second key and an identifier of the destination, wherein layer 2 (L2) processing is performed at the destination to determine a final physical egress port for the packet, and wherein the L2 processing comprises a MAC lookup operation.

2. The method defined in claim 1 wherein the first network device is a security gateway device.

3. A network device for use in a distributed network environment having a plurality of network devices, the network device comprising:

a memory;

a network interface to receive IP packets; and a processor, coupled to the memory and the network interface, operable to bind individual ports of a first network device to a security zone;

determine an ingress security zone associated with a packet received at an ingress port of the first network device based on a first key that identifies the first network device and a media access control (MAC) address of a source of a packet, wherein the ingress port of the first network device is bound to a first security zone prior to receipt of the packet at the ingress port, wherein the first security zone for the ingress port is defined by a first security level and the first key;

determine, from a MAC address for a destination of the packet, a second key that identifies a second network device that has an egress port for communicating the packet to the destination, wherein a software defined network (SDN) protocol is queried to determine the destination for the packet;

determine an egress security zone associated with the egress port of the second network device based on the egress port and the second key, wherein the egress port of the second network device is bound to a second security zone prior to transmission of the packet at the egress port, wherein the second security zone for the egress port is defined by a second security level and the second key;

perform a policy lookup based on the first security level and the first key of the ingress security zone and the second security level and the second key of the egress security zone in a policy table, wherein the policy lookup identifies a policy to apply to the packet when first security level and the second security level are different security levels, and wherein the policy lookup identifies a second policy allowing the forwarding of the packet when first security level of the first security zone and the second security level of the second security zone are at a same security level regardless of values of the first key and the second key;

apply the policy to the packet based on the first security level and the second security level when the ingress security zone and the egress security zone are different security zones; and send the packet to the destination based on the second key and an identifier of the destination, wherein layer 2 (L2) processing is performed at the destination to determine a final physical egress port for the packet, and wherein the L2 processing comprises a MAC lookup operation.

4. The network device defined in claim 3 wherein the processor performs one or more security processing operations to the packet.

5. A computer-readable non-transitory storage medium having instructions stored therein, which when executed by a network device, cause the network device to perform a method, the method comprising:

binding individual ports of a first network device to a security zone;

determining an ingress security zone associated with a packet received at an ingress port of the first network device based on a first key that identifies the first network device and a media access control (MAC) address of a source of a packet, wherein the ingress port of the first network device is bound to a first security zone prior to receipt of the packet at the ingress port, wherein the first security zone for the ingress port is defined by a first security level and the first key;

determining, from a MAC address for a destination of the packet, a second key that identifies a second network device that has an egress port for communicating the packet to the destination, wherein a software defined network (SDN) protocol is queried to determine the destination for the packet;

determining an egress security zone of a second network device based on the egress port and the second key, wherein the egress port of the second network device is bound to a second security zone prior to transmission of the packet at the egress port, wherein the second security zone for the egress port is defined by a second security level and the second key;

performing a policy lookup based on the first security level and the first key of the ingress security zone and the second security level and the second key of the egress security zone in a policy table, wherein the policy lookup identifies a policy to apply to the packet when first security level and the second security level are different security levels, and wherein the policy lookup identifies a second policy allowing the forwarding of the packet when first security level of the first security zone and the second security level of the second security zone are at a same security level regardless of values of the first key and the second key;

applying the policy to the packet based on the first security level and the second security level when the ingress security zone and the egress security zone are different security zones; and sending the packet to the destination based on the second key and an identifier of the destination, wherein layer 2 (L2) processing is performed at the destination to determine a final physical egress port for the packet, and wherein the L2 processing comprises a MAC lookup operation.

\* \* \* \* \*